US005954458A

United States Patent [19]

Lee

[11] Patent Number: 5,954,458

[45] Date of Patent: Sep. 21, 1999

[54] CORDLESS DRILL WITH ADJUSTABLE LIGHT

[75] Inventor: Judy Lee, Kowloon, The Hong Kong Special Administrative Region of the People's Republic of China

[73] Assignee: Test Rite Products Corporation, Bensenville, Fla.

[21] Appl. No.: 09/113,213

[22] Filed: Jul. 10, 1998

[51] Int. Cl.$^{6}$ .................................................... B23B 45/00

[52] U.S. Cl. ........................................ 408/16; 408/241 R

[58] Field of Search .................................. 408/16, 241 R

[56] References Cited

U.S. PATENT DOCUMENTS

| | | | |
|---|---|---|---|
| 2,525,588 | 10/1950 | Cameron et al. | 408/16 |
| 4,973,205 | 11/1990 | Spaulding | 408/16 |
| 5,445,479 | 8/1995 | Hillinger | 408/16 |

FOREIGN PATENT DOCUMENTS

| | | | |
|---|---|---|---|
| 2523891 | 9/1983 | France | 408/16 |
| 3525352 | 1/1987 | Germany | 408/16 |

*Primary Examiner*—Daniel W. Howell
*Attorney, Agent, or Firm*—Leydig, Voit & Mayer, Ltd.

[57] ABSTRACT

A integral lighting assembly on an electric power drill. The lighting assembly is powered by the same electrical power source which drives the drill. The lighting assembly provides improved illumination of working or drilling surfaces. The lighting assembly is mounted on a housing that is movable between open and closed positions to turn a light on and off, respectively.

20 Claims, 7 Drawing Sheets

CORDLESS DRILL WITH ADJUSTABLE LIGHT

FIELD OF THE INVENTION

The present invention relates generally to rotary power tools, and more particularly to electric power drills.

BACKGROUND OF THE INVENTION

Electric power drills and other such rotary power tools are widely used for a variety of construction, household and other applications. Electric power drills commonly have an electrical power source that may be provided externally by an electric cord or locally by a rechargeable battery. The electrical power source drives an electric motor in the drill to rotate a chuck at the output end. The chuck is typically adjustable and can be attached and detached to a wide variety of rotatable attachments for drilling holes, tightening fasteners, and rotating various other attachments as desired. The commercial success of a drill often depends upon durability and reliability since drills are commonly subjected to rough use.

A problem existing with prior electric drills is that they are difficult to use in dark or poorly lit areas or workspaces. It will be appreciated, for example, that it is difficult to locate drill markings and/or holes for fasteners in poorly lit areas. It is also difficult to view the progress of the drilling in poorly lit areas which can lead to overdrilled and/or underdrilled holes. A variety of safety problems may also arise from drilling in poorly lit areas.

In order to improve lighting conditions, drill operators often must resort to external light sources such as flashlights or a portable hanging lights.

Unfortunately, using such portable lights is awkward, inefficient and inconvenient. It is time consuming and difficult for drill operators to position portable lights for viewing the work surface. Indeed, when the drill operator moves locations, the portable light must be relocated as well. In certain drill applications such as small work areas, it may also be inconvenient or impossible to find a suitable and/or close surface to hang or place the portable light, and it may require more time and effort to set up the light source than to drill the holes.

SUMMARY OF THE INVENTION

Accordingly, a general aim of the present invention is to overcome the deficiencies and problems existing in the art.

Another aim of the present invention is to provide a more convenient and efficient way to illuminate working surfaces of electric rotary power tools.

It is therefore an object of the present invention to integrate a light with an electric drill to illuminate the working surface thereof, without interfering with the drill operation.

It is a further object to provide a light mechanism which is durable and does not break during normal drill usage, and which can be selectively operated by the drill operator.

It is another object of the present invention to achieve these aims and objectives in a cost efficient manner.

The present invention provides an electric rotary power tool having an integrated lighting assembly capable of illuminating a working surface for the drill. The lighting assembly includes a lighting device that is powered by the same electric power source that drives the motor of the rotary power tool. The lighting assembly includes a switch interposed between the power source and the lighting device to selectively activate the light. It is an advantage that the switch conserves power, particularly when the power source is a battery.

In one embodiment of the present invention, the electric drill with a lighting assembly is movable between two positions to selectively activate the light. The lighting assembly includes a housing that carries a lighting source. The housing is movable between two positions. Moving the housing between the activated and deactivated positions activates a switch that turns the lighting source on and off, respectively. While the light is on, the housing aligns the lighting device so that it is directed toward the chuck of the drill to illuminate the selective working surface of the drill. It is a further feature that while the light is off, the lighting device is disposed between the housing and the casing of the drill, and is therefore unexposed and protected from potential damage.

These and other objects and advantages of the invention will become more apparent from the following detailed description when taken in conjunction with the accompanying drawings.

Figure 1:
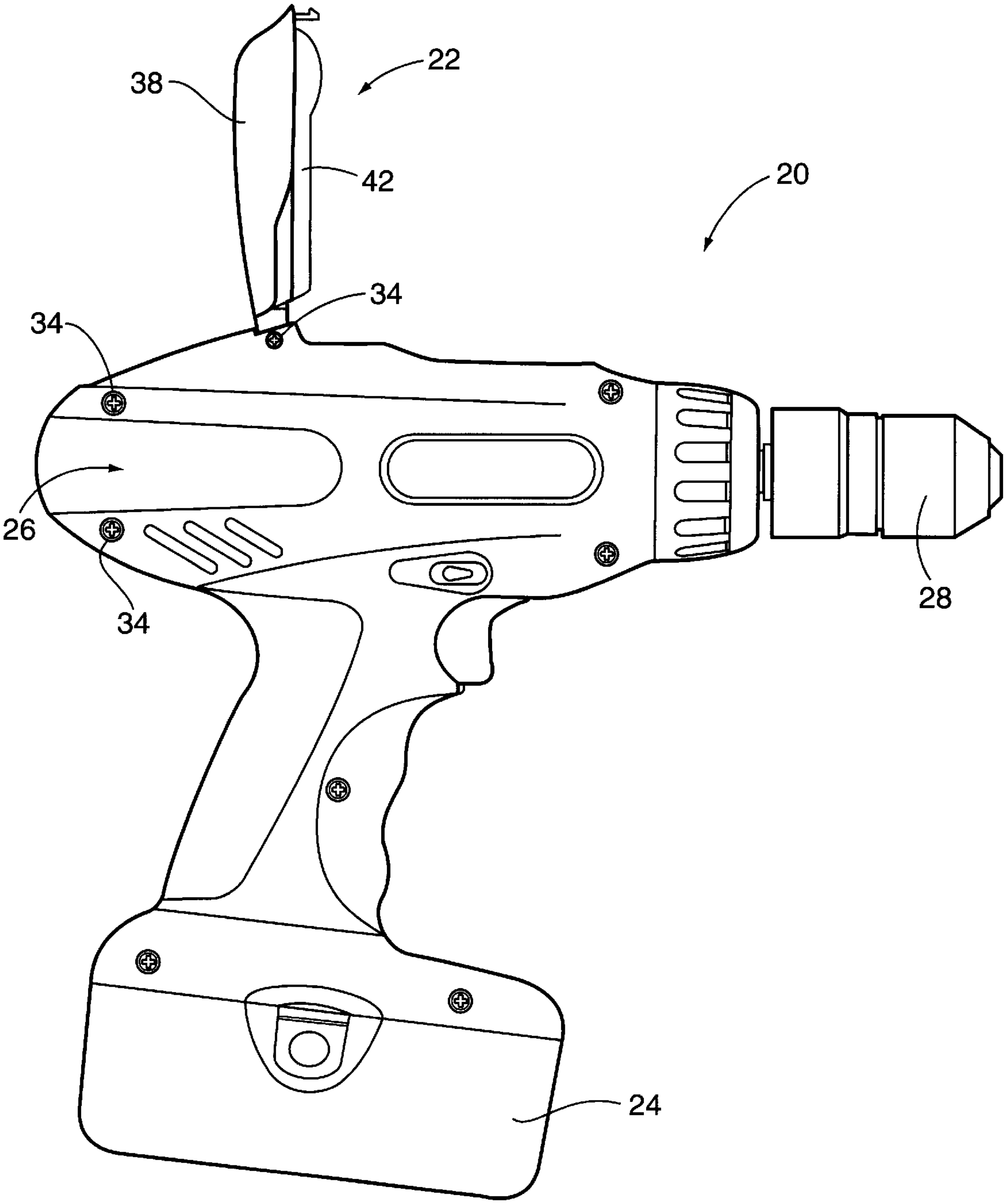
FIG. 1 is an side elevational view of a cordless drill with an integral lighting assembly according to a preferred embodiment of the present invention and showing the activated position.

While the invention is susceptible of various modifications and alternative constructions, a certain illustrative embodiment thereof has been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 2:
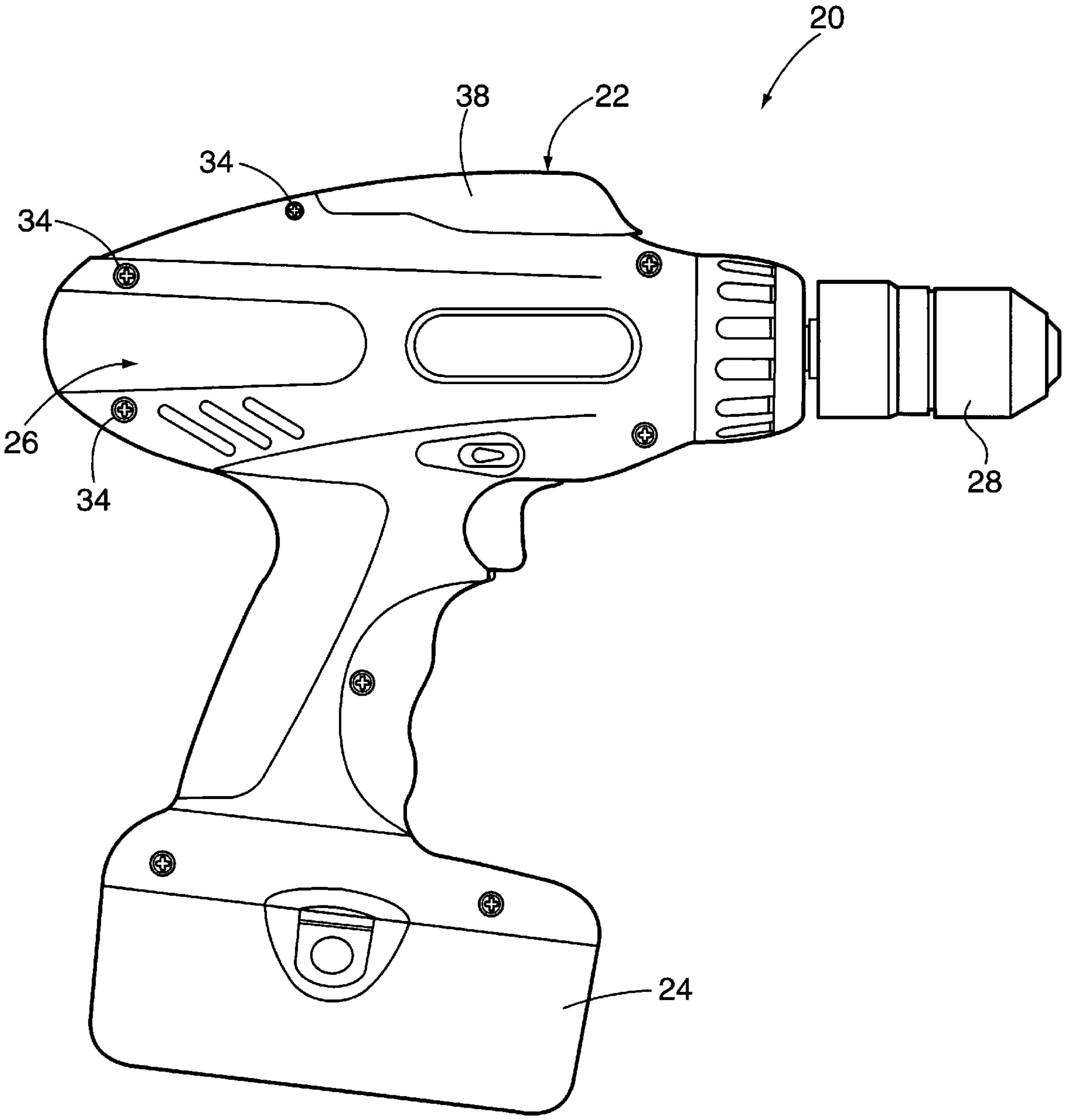
FIG. 2 is a side elevational view of FIG. 1 showing the lighting assembly in a deactivated position.
Figure 3:
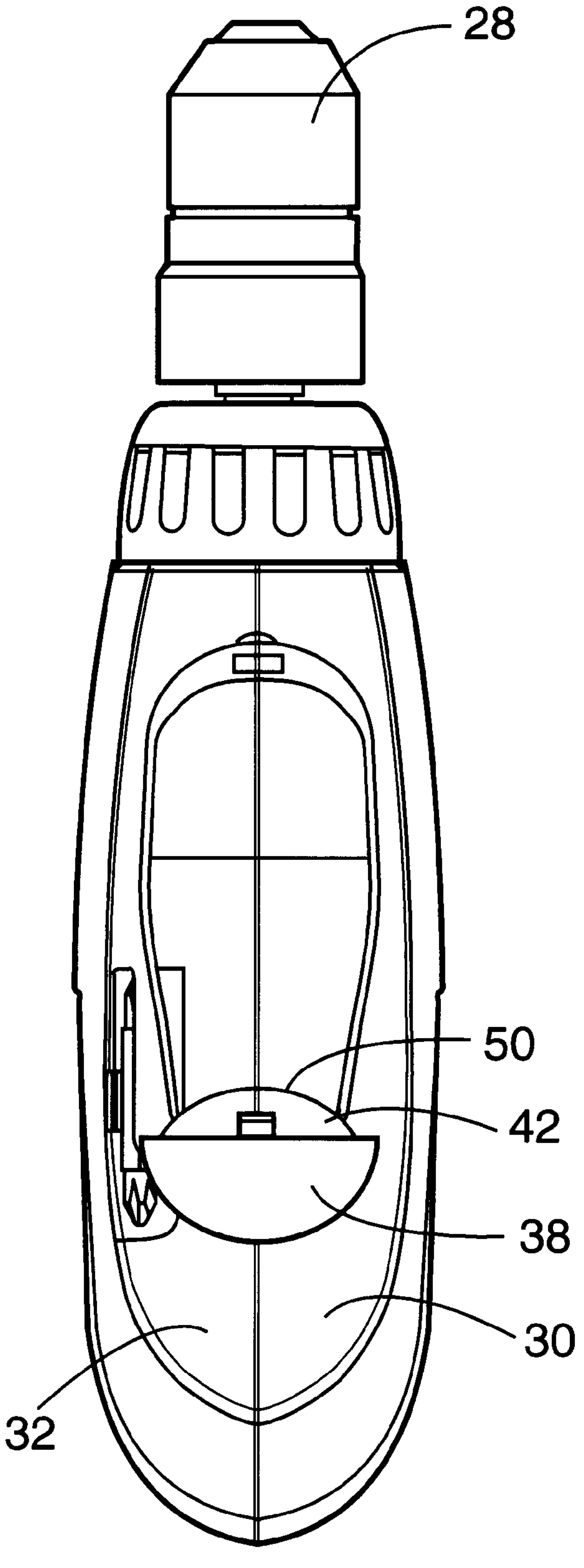
FIG. 3 is a top view of FIG. 1.

Referring to FIGS. 1–3, a preferred embodiment of the present invention has been depicted as a cordless electric drill 20 with an integral lighting assembly 22. As shown in the figures, the preferred embodiment of the drill 20 conventionally includes a detachable and rechargeable battery 24 or other electric power source, a generally hollow outer casing 26, and a standard chuck 28 for selective connection to various rotary tool attachments such as drill bits, screw drivers, and the like. As will be understood by those of skill in the art, the casing 26 generally contains and supports an electric rotary motor (not shown) therein. The electric motor is conventionally connected to the battery 24 for selectively driving the standard chuck 28 in response to depression of the trigger-like switch. As shown in FIG. 3, the outer casing 26 includes two shells 30, 32, that may be formed of durable plastic or other acceptable durable material. As shown in FIG. 1, the shells 30, 32 are affixed together by a plurality of screws 34 or other suitable fasteners.

Figure 4:
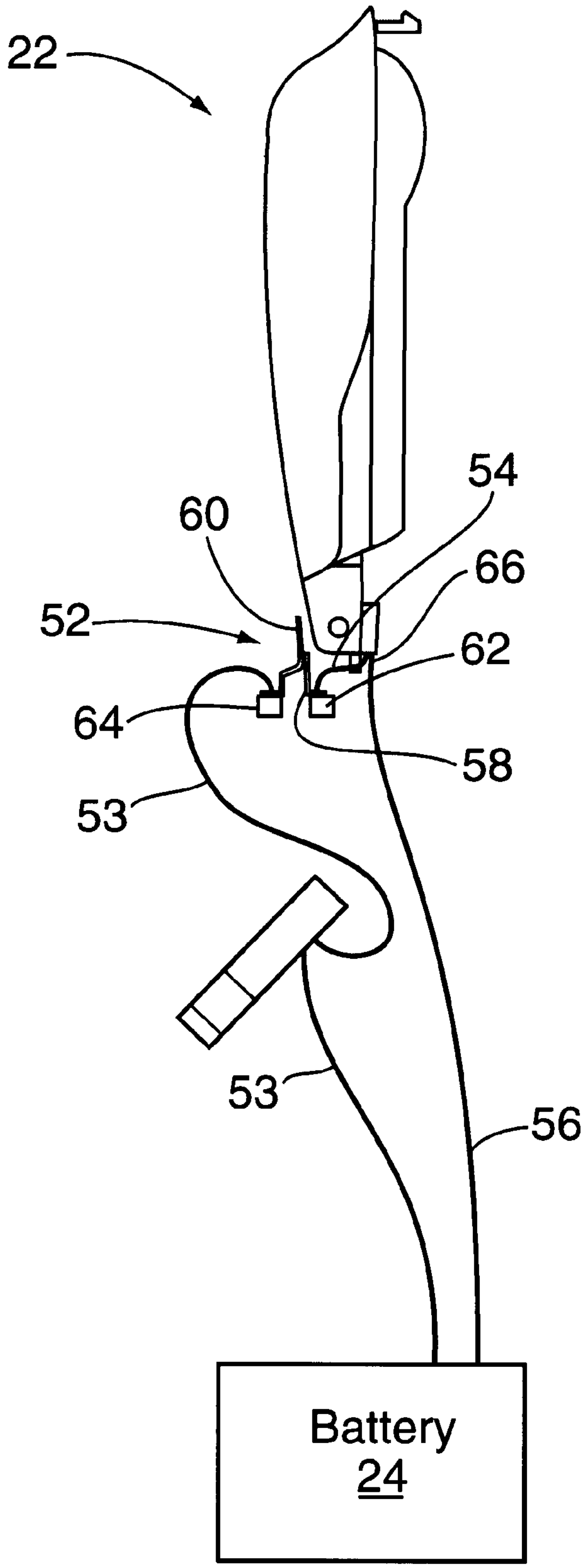
FIG. 4 is a partial schematic view showing the lighting assembly in the activated position.
Figure 6:
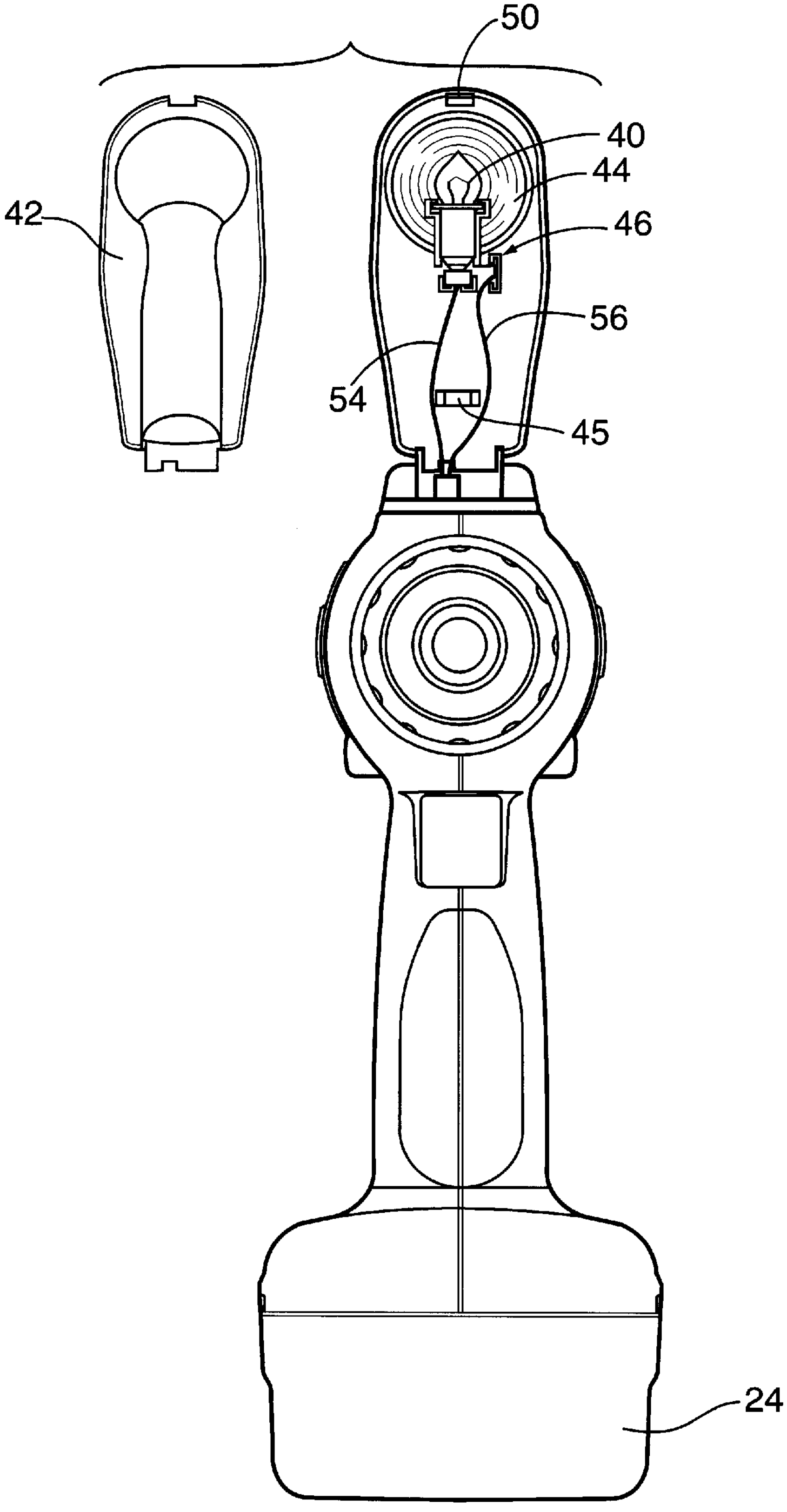
FIG. 6 is a partial fragmentary front view of an aspect of FIG. 1.

In accordance with the aim of providing a convenient and efficient way to illuminate working surfaces, the preferred embodiment includes the lighting assembly 22 which directs light generally toward the chuck 28 and in front of the chuck 28. Referring to FIGS. 4 and 6, the lighting assembly 22 of the preferred embodiment includes a housing 38, a light bulb 40 or other lighting device, a transparent cover plate 42 and a concave or partially spherical reflector cup 44. The light bulb 40 is inserted in a conventional light socket 46, which is mounted on the housing 38, and is powered by the detachable battery 24 as will be explained in greater detail below. The lighting device is encased and protected between the housing 38 and the transparent cover plate 42. The transparent cover plate 42 may be made of plastic and snaps into and out of the housing 38. The reflector cup 44 is situated outboard of the light bulb 40 for reflecting light towards the chuck 28 and to the work surface. A bracket 45 may also be mounted on the housing 38 for conveniently holding replacement light bulbs.

In accordance with the object of providing a light mechanism which is durable and does not break during normal drill usage, the lighting assembly 22 is movable between an open position as shown in FIG. 1 and a closed position as shown in FIG. 2. In the closed position, the light bulb is enclosed between the outer casing 26 and the housing 38. The top surface of the casing 26 has a channel for receiving and enclosing the light source. In the closed position, the peripheral edge of the housing 38 generally fits and mates with the corresponding top surface of the outer casing 26 so that accidental dropping or rough transportation of the drill does not damage the lighting assembly 22 or the drill 20. In the preferred embodiment, the housing may be formed of the same material as the shells 30 and is pivotably connected by a screw 34, pin or other fastener at a pivot point between the shells 30, 32. The open position of the lighting assembly 22 is maintained because of friction between the housing 38 and the shells 30, 32. The open position corresponds to about 90 degrees of rotation and is limited by an integrally formed mechanical stop generally indicated at 48 on the casing 26. The housing 38 also includes a hook portion 50 (FIG. 3) to snap into the casing 26 in the closed position.

In accordance with the object of providing a light on an electric drill which can be selectively operated by a drill operator, and referring to FIGS. 4 and 5, the drill 20 includes a light assembly which may be activated and deactivated in response to movement of the housing between the open and closed positions. In the closed position, the light is deactivated and is off. In the open position, the light is activated and operating. The light assembly includes a switch 52 that switches the light bulb 40 off and on. The switch 52 has an input wire 53 connected to the positive terminal of the battery 24, and an output wire 54 connected to the socket 46. The socket 46 also has a return wire 56 connected to the negative terminal of the battery 24. It will be appreciated by those of skill in the art that the circuit may also include a transformer (not shown) for adjusting or reducing the voltage to the light bulb.

Figure 5A:
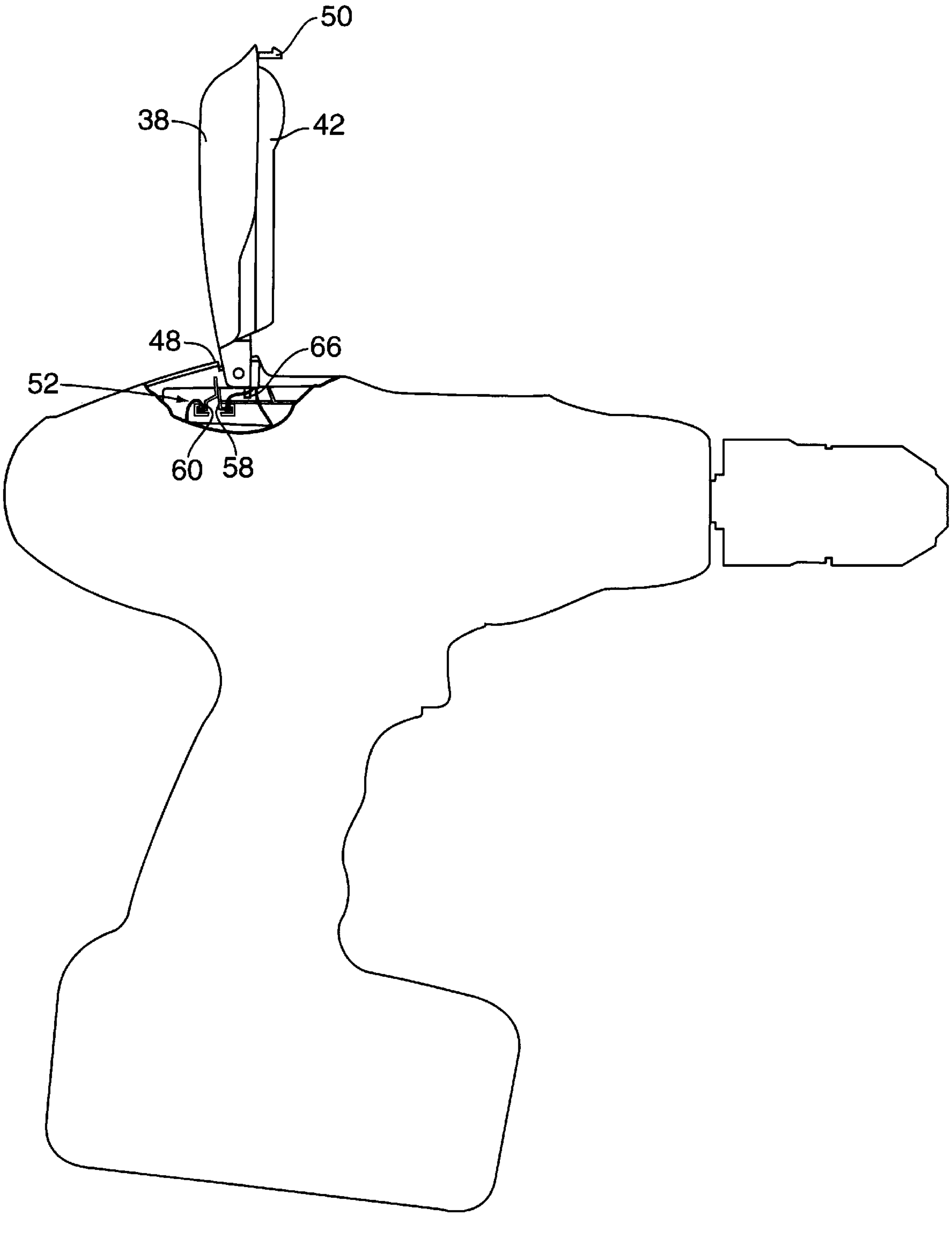
FIGS. 5*a* and 5*b* are partial fragmentary views of FIGS. 1 and 2, respectively, showing the lighting assembly in the deactivated position.
Figure 5B:
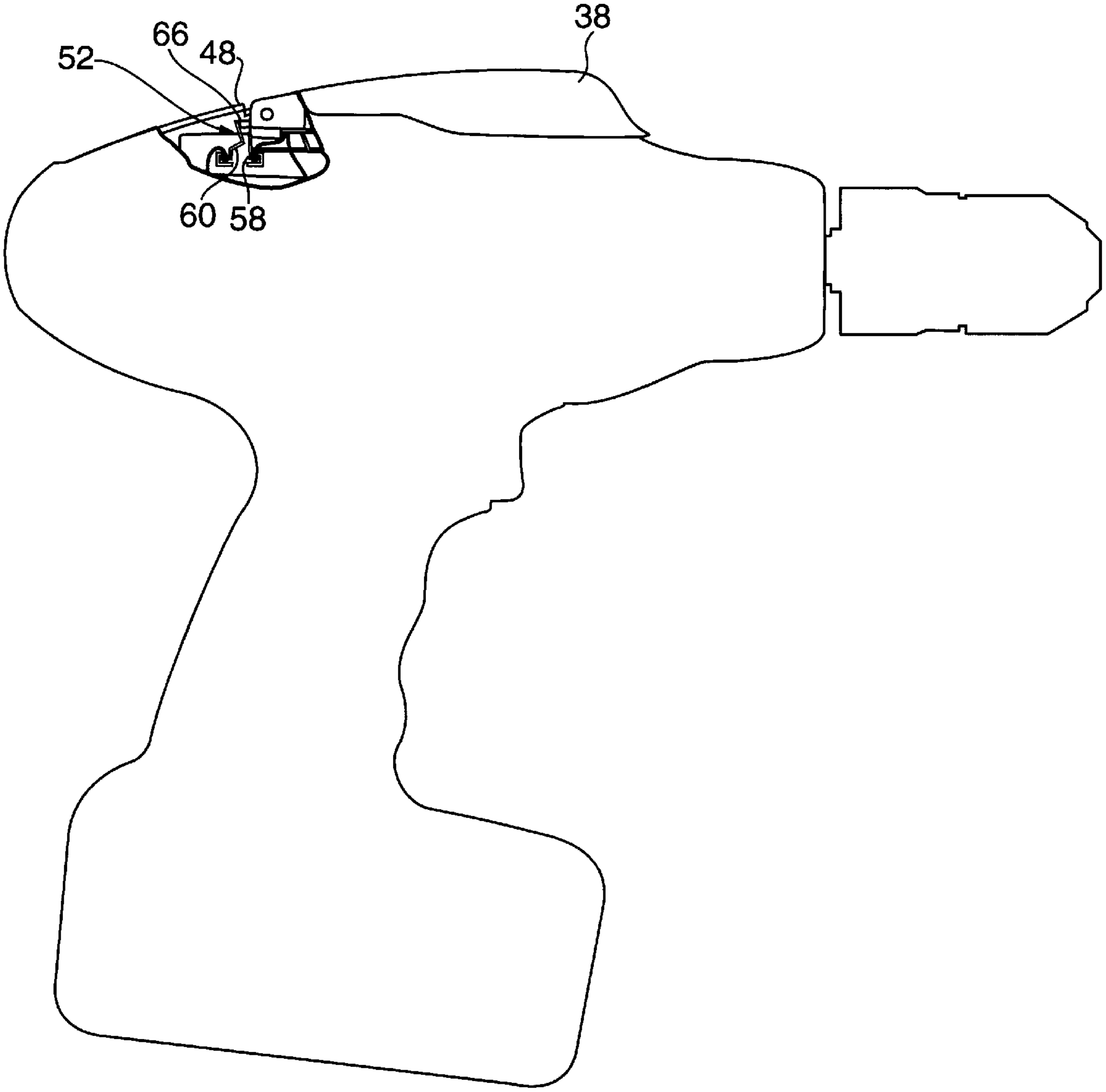

In the preferred embodiment, the switch includes two conductive contacts 58, 60. The contacts 58, 60 are secured on inner shoulder portions 62, 64 of shell 32 and connected to the input and output wires 52, 54, respectively. Contact 60 is made of resilient material and is movable towards contact 58 by rotation of the lighting assembly 22. More specifically, the housing 38 includes a finger portion 66 that pushes the resilient contact 60 toward the stationary contact 58 as the housing is pivoted from the open to the closed position. In the open position the resilient contact 60 is touching the stationary contact as seen in FIG. 5*a*, while in the closed position the resilient contact 60 is separated or disconnected from the stationary contact 58 as seen in FIG. 5*b*. It is an advantage that the light bulb 40 is off while in the closed position so that the battery 24 is not unnecessarily drained.

What is claimed is:

1. An electric rotary power tool having an outer casing, an electric motor disposed in the outer casing, any manner of chuck for selective connection to a tool attachment, an electric power source operable to drive the electric motor to rotate the chuckable end, the electric power tool comprising:

a lighting device having on and off states carried by the outer casing, wherein the lighting device directs light towards the chuck for illuminating a working surface in the on state and is deactivated in the off state;

a switch connected to the lighting device and to the electric power source for selectively connecting and disconnecting the lighting device to the electric power source and thereby activate the lighting device between on and off states, respectively, and a housing for securing the lighting device movably connected to the outer casing and movable between first and second positions relative to the outer casing for operating the switch, wherein the housing positions the switch in said first position so the lighting device is in the off state and the housing positions the switch in said second position to activate the lighting device to said on state.

2. An electric power tool having an outer casing, an electric motor disposed in the outer casing, any manner of chuck for selective connection to a tool, an electric power source operable to drive the electric motor to rotate the chuck, the electric power tool comprising a housing pivotably connected to the outer casing for movement between first and second positions relative to the outer casing, a lighting device carried by the housing, the lighting device having an energized state for directing light towards the chuck and illuminating selective working surfaces, and the lighting device having an de-energized state wherein the lighting device does not generate light, and a switch selectively connecting the electric power source and the lighting device, wherein the switch connects the lighting device to the power source and activates the lighting device to the energized state in response to movement of the housing to the second position, and the switch disconnects the lighting device from the power source and deactivates the lighting device to the de-energized state in response to movement of the housing towards the first position.

3. The electric power tool of claim 2 comprising a finger disposed on the housing and wherein the switch further includes a resilient contact which has two positions corresponding to the de-energized and energized states for the lighting device, and wherein the finger is disposed for moving the resilient contact between the two positions in response to engagement with the finger as the housing is pivoted between first and second positions.

4. The electric rotary power tool of claim 1 wherein the housing is pivotably connected to the casing about a pivot point for movement between the first and second positions, and the outer casing defines a mechanical stop to limit the rotational movement of the housing.

5. The electric rotary power tool of claim 1 further comprising a transparent cover connected to the housing, and the lighting device interposed between the transparent cover and the housing.

6. The electric rotary power tool of claim 1 wherein the lighting device is contained between the housing and the outer casing while the housing is in the first position, and the lighting device is exposed as the housing is moved from the first position to the second position.

7. The electric rotary power tool of claim 1 wherein the electric power source is a rechargeable battery, and the electric rotary power tool is a drill.

8. An electric drill having an outer casing, an electric motor, an electric power source, and any manner of chuck for selective connection to a tool attachment, the electric power source operable to drive the electric motor to rotate the chuck, the outer casing containing the electric motor therein, comprising:

a lighting device having on and off states, a housing pivotably connected to the outer casing and pivotable between a first position and a second position relative to the outer casing, the lighting device being carried by the housing, the lighting device directing light towards the chuck while the housing is in the second position for illuminating selective working surfaces;

a switch connected to the electric power source and connected to the lighting device, the switch connecting the lighting device to the power source in the second position for switching the lighting device to the on state, the switch disconnecting the lighting device from the power source in the first position to switch the lighting device to the off state.

9. The electric drill of claim 8 wherein the lighting device is enclosed between the housing and the casing while the housing is in the first position, thereby protecting the lighting device from damage while the lighting device is in the off state.

10. The electric drill of claim 8 further comprising a concave reflector cup mounted on the housing, the concave reflector cup operable to reflect light from the lighting device towards the chuckable end while the housing is in the second position.

11. The electric drill of claim 8 further comprising a transparent cover connectable to the housing, the lighting device interposed between the transparent cover and the housing, the transparent cover being detachable from the housing to provide access for replacing the lighting device.

12. The electric drill of claim 11 wherein the lighting device is a replaceable light bulb, and wherein the electric drill further comprises a bracket sized to hold a replacement light bulb, the bracket affixed to the housing between the housing and the transparent cover.

13. The electric drill of claim 8 wherein the electric power source is a rechargeable battery that is attachable and detachable to the casing.

14. The electric drill of claim 8 wherein the switch further includes a resilient contact which has two positions corresponding to off and on states for the lighting device, and wherein the housing further includes a finger, the finger moving the resilient contact as the housing is pivoted between first and second positions.

15. The electric power tool of claim 2 wherein the electric power source is a rechargeable battery.

16. The electric drill of claim 2 wherein the lighting device is enclosed between the housing and the casing while the housing is in the first position so that the lighting device is protected from damage while the lighting device is in the de-energized state.

17. The electric power tool of claim 2 comprising a concave reflector cup mounted on the housing for reflecting light from the lighting device towards the tool while the housing is in the second position.

18. The electric power tool of claim 2 comprising a transparent cover detachably connected to the housing, wherein the lighting device is interposed between the transparent cover and the housing, and the transparent cover is selectively detachable from the housing to provide access for replacing the lighting device.

19. The electric power tool of claim 18 wherein the lighting device is a replaceable light bulb.

20. The electric power tool of claim 19 comprising a bracket for holding a replacement light bulb attached to the housing between the housing and the transparent cover.

* * * * *